United States Patent
Atmur

(10) Patent No.: US 6,927,965 B2
(45) Date of Patent: Aug. 9, 2005

(54) FUEL LEVEL SENSOR SAFETY BARRIER

(75) Inventor: Robert J. Atmur, Whittier, CA (US)

(73) Assignee: The Boeing Company, Seattle, WA (US)

( * ) Notice: Subject to any disclaimer, the term of this patent is extended or adjusted under 35 U.S.C. 154(b) by 94 days.

(21) Appl. No.: 10/397,643

(22) Filed: Mar. 25, 2003

(65) Prior Publication Data

US 2004/0187614 A1 Sep. 30, 2004

(51) Int. Cl.[7] .......................... G01F 23/00; G01D 3/08
(52) U.S. Cl. ..................................... 361/118; 73/290 R
(58) Field of Search .......................... 73/304 R–304 C, 73/290 R, 301, 308, 313, 866.1; 361/118–119

(56) References Cited

U.S. PATENT DOCUMENTS

| | | | | |
|---|---|---|---|---|
| 3,797,311 A | * | 3/1974 | Blanchard et al. | 73/304 C |
| 3,958,159 A | * | 5/1976 | Rauchwerger | 73/304 C X |
| 4,019,067 A | * | 4/1977 | Gladstone | 73/304 R X |
| 4,485,673 A | * | 12/1984 | Stern | 73/304 C |
| 4,528,839 A | * | 7/1985 | Blanchard et al. | 73/304 C X |
| 4,556,927 A | * | 12/1985 | Steger | 361/215 |
| 5,710,552 A | * | 1/1998 | McCoy et al. | 340/870.21 |
| 6,141,194 A | * | 10/2000 | Maier | 361/58 |
| 2002/0121366 A1 | * | 9/2002 | Bass et al. | 166/53 |
| 2003/0094044 A1 | * | 5/2003 | Kruger et al. | 73/313 |

* cited by examiner

Primary Examiner—Thomas P. Noland
(74) Attorney, Agent, or Firm—Black Lowe & Graham, PLLC

(57) ABSTRACT

A fuel level sensor system is provided that passively protects fuel sensors and fuel tanks from receiving voltages from fuel level sensing electronics that exceed safety threshold values. The fuel level sensor system includes a safety barrier device that is located outside of a fuel tank. The safety barrier device includes a housing and a transformer located within the housing. The transformer is electrically coupled between fuel level sensing electronics and a fuel level sensor within the fuel tank. The transformer protects the fuel tank from voltages that exceed a predefined threshold value.

13 Claims, 3 Drawing Sheets

FUEL LEVEL SENSOR SAFETY BARRIER

FIELD OF THE INVENTION

This invention relates generally to fuel systems and, more specifically, to fuel sensing systems.

BACKGROUND OF THE INVENTION

The Federal Aviation Administration (FAA) provides directives to the commercial aircraft industry based on the continuous study of failures and losses of aircraft. One such directive, titled SFAR 88, sets out that fuel level sensing systems must be intrinsically safe against worst-case voltage applications.

Some examples of currently known suppression devices that are used to meet this directive include zener diodes, fuses, or crowbar circuits. However, these devices do not provide systems that can meet the requirements of the directive in the most cost-effective manner.

Therefore, there is an unmet need to provide a low-cost, easy to install device for measuring fuel levels that adheres to regulatory standards.

SUMMARY OF THE INVENTION

The present invention provides a low cost, intrinsically safe fuel level sensor system. The present invention provides passive protection with an easy-to-manufacture transformer unit that does not require modification of present fuel level sensor electronics.

One embodiment of the present invention provides a fuel level sensor system that includes a safety barrier device that is located outside of a fuel tank. The safety barrier device includes a housing and a transformer located within the housing. The transformer is electrically coupled between fuel level sensing electronics and a fuel level sensor within the fuel tank. The transformer protects the fuel tank from voltages that exceed a predefined threshold value.

In one aspect of the invention, the transformer includes a toroid, and first and second coils wrapped at least once around the toroid. The safety barrier device includes first and second shields located within the housing. The first shield is positioned around the first coil and the second shield is positioned around the second coil.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
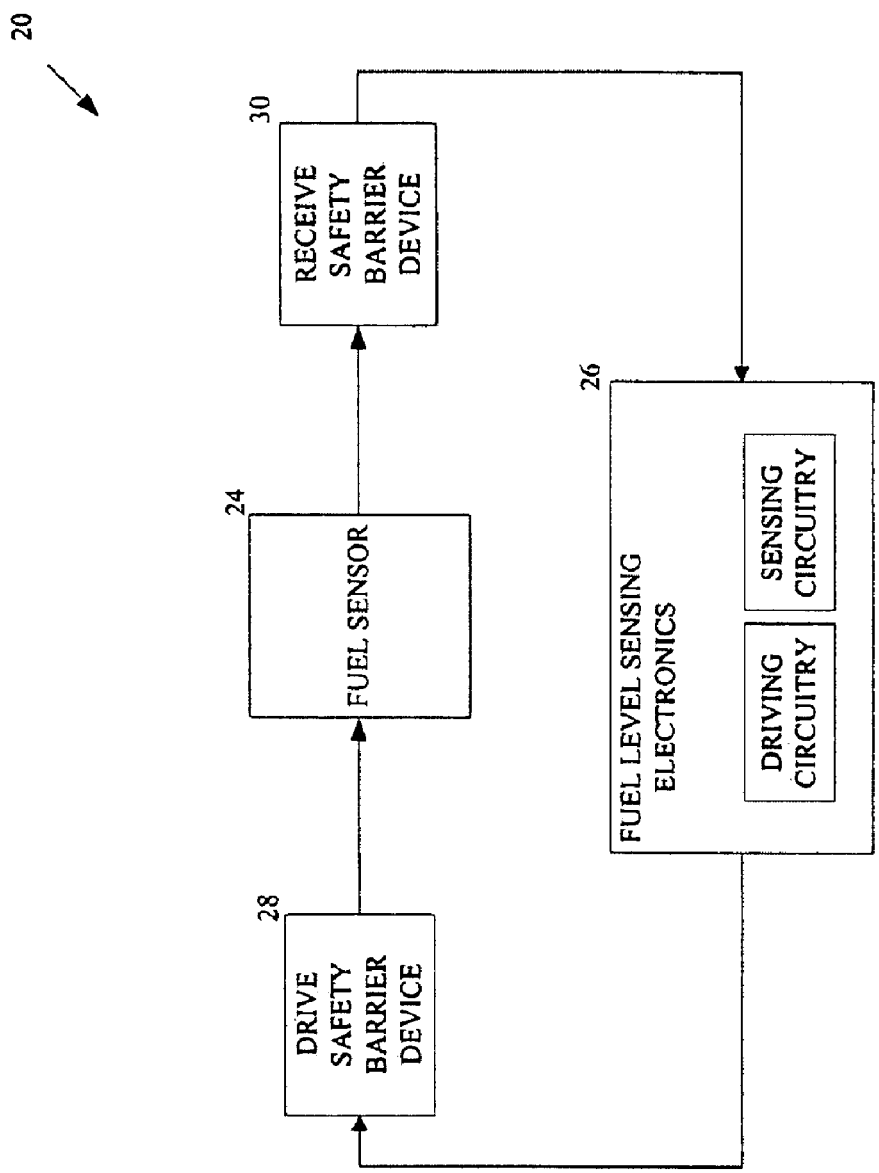
FIG. 1 is a block diagram of the present invention.

As shown in block diagram form in FIG. 1, the present invention provides a system 20 for sensing fuel level in a fuel tank, such as without limitation a fuel tank in an aircraft, and protecting a fuel level sensor 24 from any surges in voltage coming from aircraft circuits. The system 20 includes the fuel level sensor 24, fuel level sensing electronics 26, a drive safety barrier device 28, and a receive safety barrier device 30. The drive safety barrier device 28 is connected to the fuel level sensor 24 and driving circuitry of the fuel level sensing electronics 26. The receive safety barrier device 30 is connected to the fuel level sensor 24 and sensing circuitry of the fuel level sensing electronics 26.

The drive safety barrier device 28 and the receive safety barrier device 30 limit the amount of voltage applied to the fuel level sensor 24 even when a large voltage (e.g., 760 VAC) is applied to either of the safety barrier devices 28 or 30. The safety barrier devices 28 and 30 shield the fuel level sensor 24 from unwanted electrostatic and magnetic signals.

Figure 2:
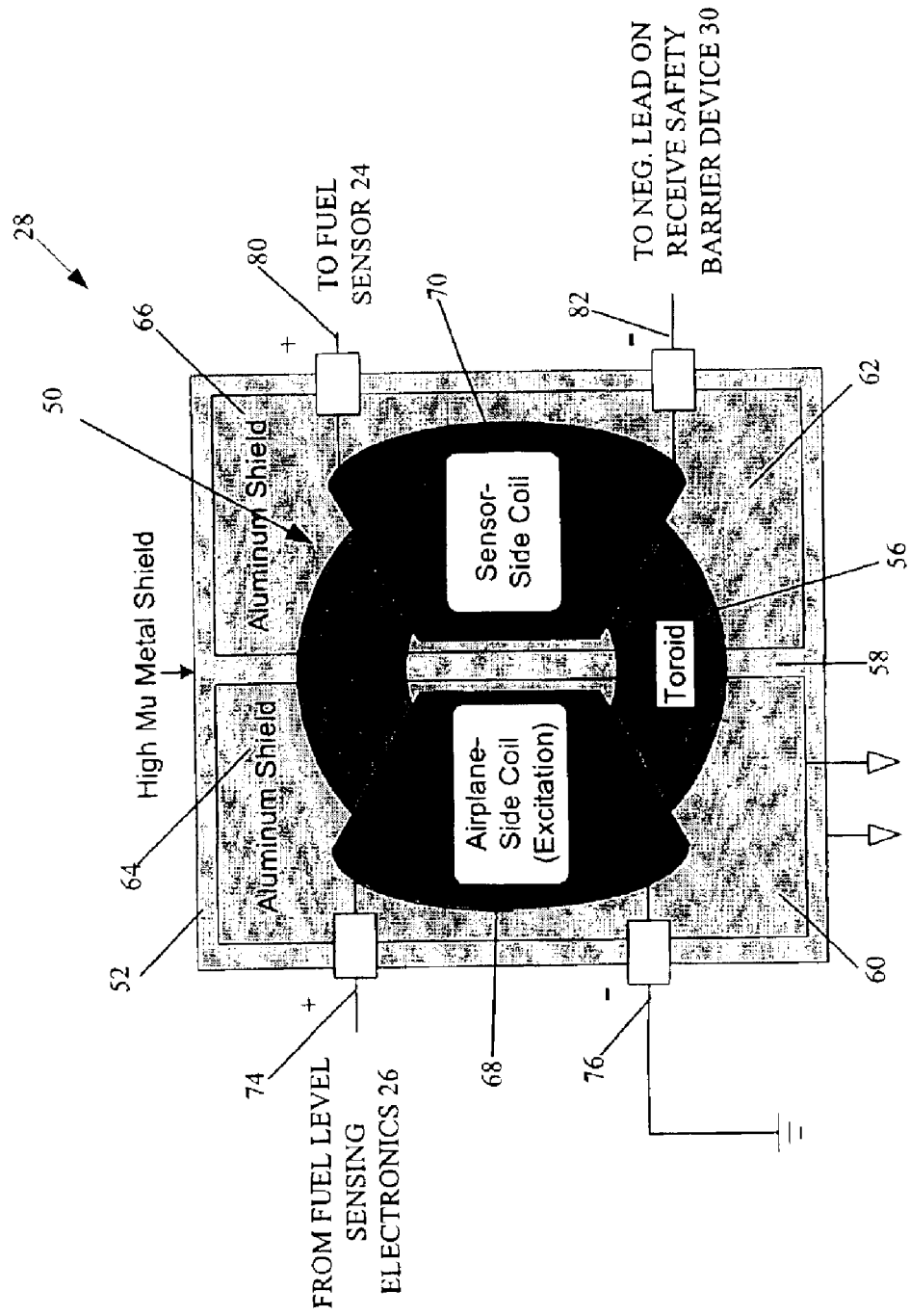
FIGS. 2 and 3 are diagrams of safety barriers formed in accordance with the present invention.

As shown in FIG. 2, the drive safety barrier device 28 is designed to saturate at voltage, or current levels below those which pose a safety hazard as predicated in SFAR 88. An exemplary drive safety barrier device 28 includes an energy-limited transformer 50 and a magnetic field shield 52. The shield 52 is suitably box-shaped that surrounds the transformer 50. The shield 52 is suitably a highly permeable shield for protecting components within the shield 52 from magnetic interference. The shield is made from a material similar to Carpenter49™ material. The shield 52 includes a center wall 58 that separates the device 28 into two halves 60 and 62. The transformer 50 includes a toroid 56, an airplane-side coil 68, and a sensor-side coil 70. The toroid 56 is suitably a doughnut-shaped piece of magnetic material that passes through openings in the center wall 58 to allow the toroid 56 to occupy space with the two halves 60 and 62.

The airplane-side coil 68 is wrapped around the toroid 56 in the first hall 60 and the sensor-side coil 70 is wrapped around the toroid 56 in the second half 62. The airplane-side coil 68 includes a positive lead 74 and a negative lead 76 that are connected to the drive circuitry of the fuel level sensing electronics 26. The negative lead 76 is connected to ground and the positive lead 74 receives a drive signal from the drive circuitry. It will be appreciated that the characteristics of the transformer 50 can be altered by changing the number of times a conductor comprising the coil is wrapped around the toroid. It will also be appreciated that other magnetic devices may be used in place of the toroid 56.

The sensor-side coil 70 includes a positive lead 80 and a negative lead 82. The positive lead 80 is connected to the fuel level sensor 24 and the negative lead 82 is connected to a negative lead on the receive safety barrier device 30.

The two halves 60 and 62 include shields 64 and 66 that surround the coils 68 and 70. The first shield 64 is connected to the negative lead 76 and the second shield 66 is connected to the negative lead 82. The shields 64 and 66 are suitably formed of Aluminum, but can be any other material that performs electrostatic or magnetic protection.

The coils 68 and 70 are both isolated from the toroid by insulation (not shown). Non-limiting examples of the insulation is KAPTON or DELRIN. The coils 68 and 70 are physically isolated from the insulation by an epoxy cover (not shown).

The transformers 50 are suitably designed to saturate at a very low voltage in order to provide an energy-limited intrinsic safety barrier between the fuel level sensor 24 and the fuel level sensing electronics 26. In one embodiment, the transformer 50 is designed to saturate just above operating voltage for the fuel level sensor 24.

Figure 3:
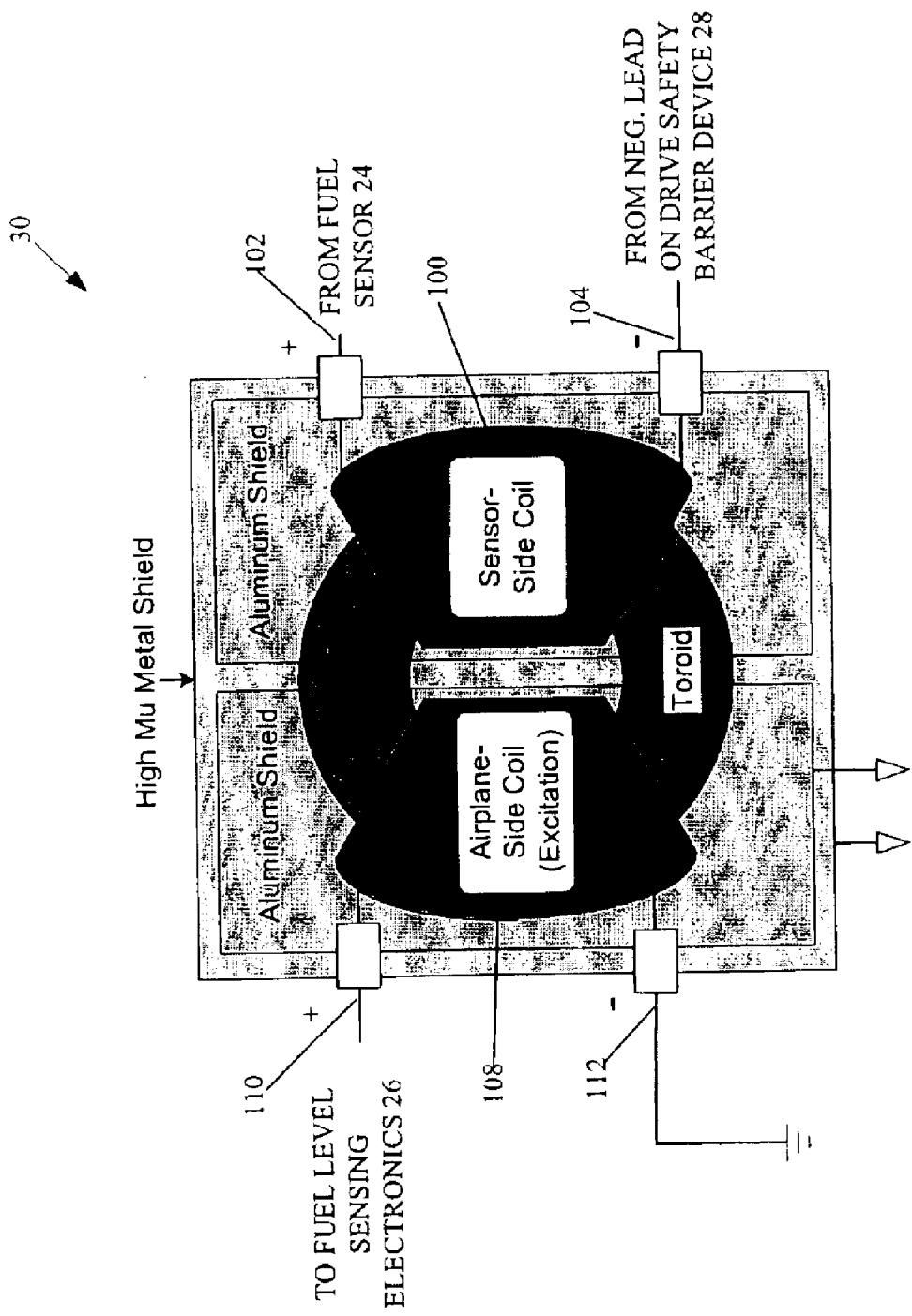

As shown in FIG. 3, the receive safety barrier device 30 is constructed similarly to the drive safety barrier device 28. The receive safety barrier device 30 includes a sensor-side coil 100 that includes a positive lead 102 that is coupled to the fuel level sensor 24 and a negative lead 104 that is connected to the negative lead 82 on the drive safety barrier device 28. The receive safety barrier device 30 also includes an airplane-side coil 108 that includes a positive lead 110 that is coupled to the fuel level sensing electronics 26 and a negative lead 112 that is connected to ground.

As will be appreciated the number of times the coils 68 and 70 wrap around the toroid 56 can vary depending upon the power level at which saturation is desired.

The present invention operates as follows. A first drive signal is sent to the drive safety barrier device 28 that converts the first drive signal into a magnetic field signal. The magnetic field signal is converted into a second drive signal that is sent to the fuel level sensor 24 located within the fuel tank. The drive safety barrier device 28 protects the fuel tank from voltages that exceed a predefined threshold value.

The fuel level sensor 24 generates a first sensed signal and sends the generated first sensed signal to the receive safety barrier device 30. The receive safety barrier device 30 converts the first sensed signal into a second magnetic field signal and converts the second magnetic field signal into a second sensed signal. The second sensed signal is sent to the fuel level sensing electronics 26.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A safety barrier device for a fuel level system, the safety barrier device comprising:

a housing located outside of a fuel tank; and a transformer located within the housing, the transformer having a first coil electrically coupled to fuel level sensing electronics and a second coil electrically coupled to a fuel level sensor within the fuel, the first coil and the second coil being operable to magnetically couple the sensing electronics and the fuel level sensor to protect the fuel tank from voltages that exceed a predefined threshold value, the housing having an internal wall interposed between the first coil and the second coil.

2. The safety barrier device of claim 1, wherein the transformer includes a magnetic core and further wherein the first and second coils are wrapped at least once around the magnetic core.

3. The safety barrier device of claim 2, wherein the magnetic core is a toroid.

4. The safety barrier device of claim 2, further comprising first and second shields located within the housing, wherein the first shield is positioned around the first coil and the second shield is positioned around the second coil.

5. The safety barrier device of claim 1, wherein the housing shields the transformer from magnetic fields external to the housing.

6. The safety barrier device of claim 1, further comprising insulation located within the housing.

7. A system for protecting a fuel tank, the system comprising:

fuel level sensing circuitry;

a fuel level sensor located within a fuel tank; and one or more transformers located outside of the fuel tank and electrically coupled between the fuel level sensor and the fuel level sensing circuitry, the transformers including a first coil, a second coil, and a magnetically permeable wall interposed between the first coil and the second coil, the one or more transformers being operable to protect the fuel tank from voltages that exceed a predefined threshold value.

8. The system of claim 7, wherein the fuel level sensing circuitry includes:

drive circuitry for generating a fuel level sensor drive signal; and sensing circuitry for analyzing fuel level sensor signals.

9. The system of claim 7, wherein the one or more transformers include a magnetic core, and further wherein the first and second coils are wrapped at least once around the magnetic core.

10. The system of claim 9, wherein the one or more transformers is a drive transformer and the first coil is coupled to the fuel level sensing circuitry and the second coil is coupled to the fuel level sensor.

11. The system of claim 9, wherein the one or more transformers is a receive transformer and the first coil is coupled to the fuel level sensor and the second coil is coupled to the fuel level sensing circuitry.

12. The system of claim 9, wherein the magnetic core is a toroid.

13. The system of claim 7, wherein the one or more transformers include one or more shields for shielding the transformer from electromagnetic signals.

* * * * *